Patented Mar. 22, 1927.

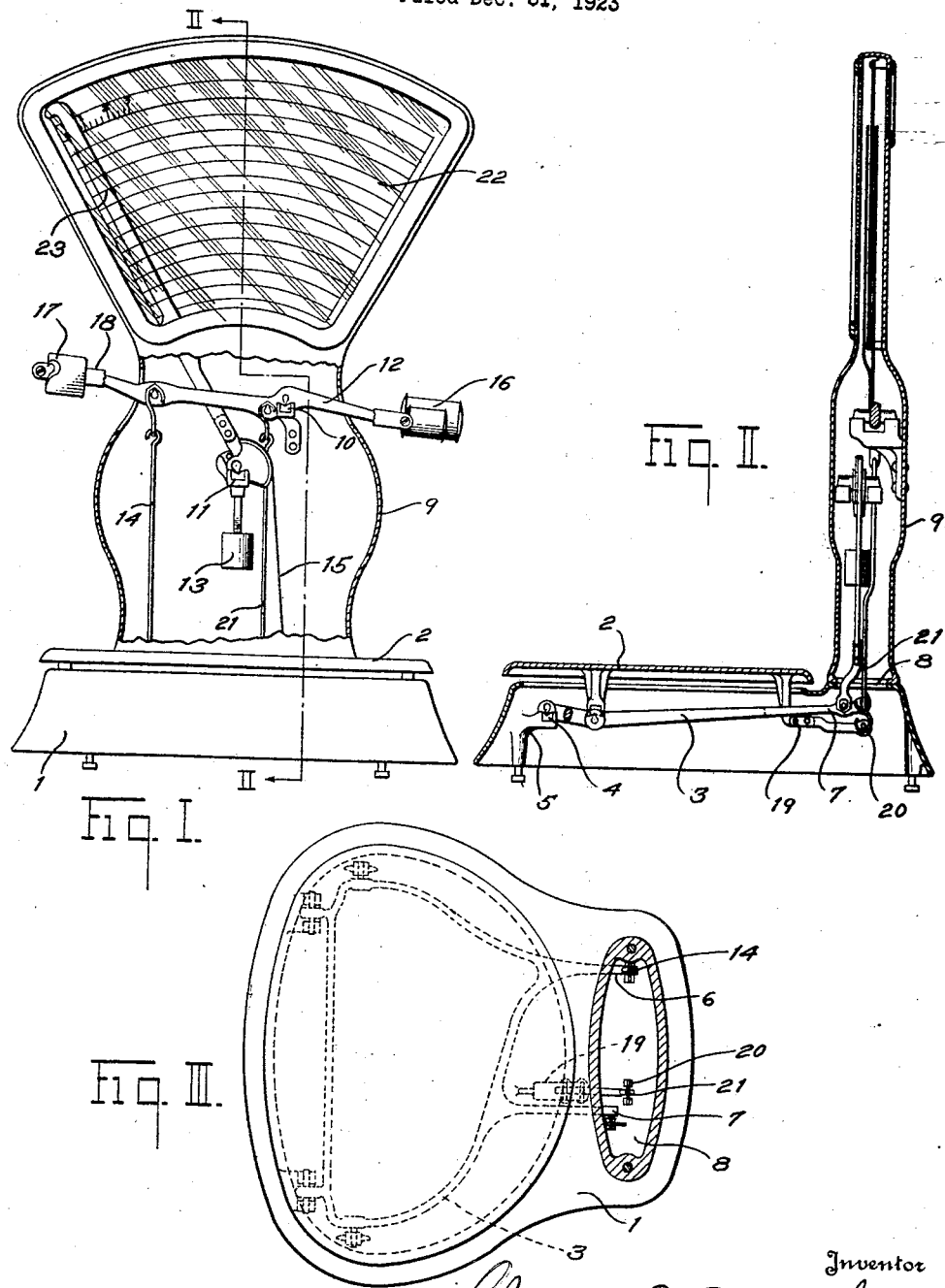

1,622,041

UNITED STATES PATENT OFFICE.

CHARLES O. MARSHALL, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed December 31, 1923. Serial No. 683,626.

This invention relates to weighing scales, and particularly to the lever mechanism thereof, and one of its principal objects is to provide lever mechanism in which the effect of the load upon the counterbalancing mechanism is not affected by its position upon the scale platform.

Another object is the provision of a scale having a single platform lever, with means for maintaining the platform level throughout weighing movements of the scale in which all the forces act substantially vertically.

Another object is the provision of a scale having a low down platform supported upon a single platform lever and a tare beam located in convenient position above the platform, the platform lever and platform being so connected to the tare beam that the platform is kept level throughout all weighing movements of the scale.

Other objects and advantages will be apparent from the following description, in which reference is had to the accompanying drawings illustrating a preferred embodiment of my invention and wherein similar reference numerals designate similar parts throughout the several views.

In the drawings:

Figure I is a front elevational view of a scale embodying my invention, parts being broken away to show some of the mechanism;

Figure II is a vertical sectional view taken substantially on the line II—II of Figure I; and Figure III is a plan view showing the base and platform of the scale, the platform lever being shown in dotted lines.

The base 1 of the scale may be of any desired shape, but preference is given the shape illustrated for the reason that it corresponds to the shape of a platform 2 which is conveniently wide at its front side and is not likely to be tipped off the load pivots of the platform lever 3 by a load placed near its edge.

The lever 3 is fulcrumed on bearings 4 mounted in brackets 5 which project from the inside of the front wall of the base housing 1. From the fulcrum bearings 4 the lever extends rearwardly and terminates in two noses 6 and 7, both of which lie beneath an opening 8 in the base housing.

Mounted upon the base housing above the opening 8 is an upright housing 9 within which are supported fulcrum bearings 10 and 11 for a tare beam lever 12 and a pendulum 13. The noses 6 and 7 of the platform lever 3 are connected respectively by means of a link 14 and a ribbon 15 to the tare beam lever 12 and the pendulum 13. The tare beam lever 12 is provided with a counterweight 16 which counterbalances the weight of the platform lever 3 and the parts supported thereby, as well as the weight of a tare poise 17 which is slidably mounted on a beam 18 fixed to the tare beam lever.

The platform 2 is provided with an arm 19 which extends downwardly into the base housing 1 and thence rearwardly to a point beneath the opening 8, where it is provided with a pivot 20 which is connected by means of a link 21 to the tare beam lever 12.

The ratio of the distances from the fulcrum lever of the tare beam lever 12 to the points of connection of the links 21 and 14 is the same as the ratio of the distances from the fulcrum pivot of the platform lever 3 to its load pivot and its point of connection with the link 14.

The upper part of the upright housing 9 is provided with a fan-shaped chart 22, and an indicator hand 23 is fixed to the pendulum 13 so that when the pendulum swings to the left the indicator hand 23 moves over the chart 22 to the right to a position in which the weight and value of the load at certain prices per pound is indicated.

When a load is placed upon the platform 2 of the scale in a position substantially above the load pivots of the lever 3, the platform lever 3 is swung downwardly, thus pulling downwardly upon the ribbon 15 and causing the pendulum 13 to swing to the right until a position of equilibrium is reached. As the lever 3 swings downwardly the link 14 is also drawn downwardly and the tare beam lever 12 is swung about its pivot, thus lowering the link 21 and the arm 19 of the platform 2 to which the link 21 is attached. Since the distances from the fulcrum pivot of the lever 12 to the lever's points of connection with the links 21 and 14 are proportional to the distances from the fulcrum pivot of the lever 3 to its load pivot and its point of connection with the link 14, the portion of the platform supported by the arm 19 will be lowered to the same extent as the portion supported by the load pivot of the lever 3, and the platform will thus remain level throughout all weighing movements.

If a load is placed adjacent the rear side of the platform, a downward pull will be exerted through the arm 19 upon the link 21 and the tare beam lever 12 will be again swung about its pivot, thus allowing the link 14 to move downwardly and the weight of the lever 3 and the front part of the platform to pull downwardly upon the ribbon 15 and swing the pendulum 13 to the left until a condition of equilibrium is reached, the platform remaining level throughout the movement of the scale. The result of placing a load upon the platform is thus the same whether the load is placed upon the front or rear part of the platform. Since the tare beam lever is utilized to prevent the platform from tipping, no check links are necessary. Notwithstanding the fact that the scale has only a single platform lever and no check links, the parts are so arranged that the tare beam and the weighing scale chart are directly in front of the operator when the operator stands in front of the scale platform.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a platform lever, a platform supported thereby, a beam lever, a beam carried by said beam lever located above said platform lever and platform, and links connecting said platform lever and platform directly to said beam lever whereby the platform is maintained level throughout weighing movements.

2. In a weighing scale, in combination, a platform lever, a platform supported thereby, a beam lever, a beam carried by said beam lever, and links connecting said platform lever and said platform directly to said beam lever, whereby the platform is maintained level throughout weighing movements.

3. In a weighing scale, in combination, a platform lever, a platform partly supported thereby, a beam lever, a beam carried by said beam lever, and means connecting said platform and said platform lever to said beam lever, the points of connection of said platform and said platform lever to said beam lever and the points of connection of said platform and said beam lever to said platform lever being proportionally distant from the fulcrum of said beam lever and said platform lever.

4. In a weighing scale, in combination, a platform lever, a platform supported thereby, automatic load-counterbalancing mechanism, a beam lever, a beam carried by said beam lever, means connecting said platform lever to said automatic load-counterbalancing mechanism and said beam lever, and means connecting said platform to said beam lever, whereby said platform is maintained level throughout weighing movements of the scale.

5. In a weighing scale, in combination, a base, a platform lever supported thereby, a platform partly supported by said platform lever, a frame mounted on said base, a beam lever supported on said frame and extending transversely with respect to said platform lever, a beam carried by said beam lever, a link connecting said platform lever to said beam lever, and a link connecting said platform to said beam lever, whereby said platform is maintained level throughout weighing movements of the scale.

6. In a weighing scale, in combination, a base, a platform lever supported thereby, a platform partly supported upon said platform lever, a frame mounted on said base, a beam lever supported by said frame above the level of said platform and extending transversely to said platform lever, automatic load-counterbalancing mechanism supported by said frame, means connecting said platform lever to said automatic load-counterbalancing mechanism and said beam lever, and means connecting said platform to said beam lever, whereby said platform is maintained level throughout weighing movements of the scale.

7. In a device of the class described, in combination, a base housing, a platform lever supported therein, a platform partly supported by said platform lever, an upright housing mounted upon the rear end of said base housing, a pendulum supported in said upright housing and having an indicator, a chart in said upright housing facing said platform and adapted to co-operate with said indicator, a beam lever supported by said upright housing and extending transversely to said platform lever, means connecting said platform lever and said pendulum, means connecting said platform lever and said beam lever, and means connecting said platform and said beam lever, whereby said platform is maintained level throughout weighing movements of the scale.

CHARLES O. MARSHALL.